Sept. 1, 1931.  D. S. BARROWS  1,821,285
REMOVABLE PIPE ORGAN VALVE
Filed Oct. 16, 1928  3 Sheets-Sheet 1

Inventor
Donald S. Barrows
By Ernest T. Meckl
His Attorney

Sept. 1, 1931.   D. S. BARROWS   1,821,285
REMOVABLE PIPE ORGAN VALVE
Filed Oct. 16, 1928   3 Sheets-Sheet 2

Sept. 1, 1931. D. S. BARROWS 1,821,285
REMOVABLE PIPE ORGAN VALVE
Filed Oct. 16, 1928 3 Sheets-Sheet 3

Inventor
Donald S. Barrows
By
His Attorney

Patented Sept. 1, 1931

1,821,285

UNITED STATES PATENT OFFICE

DONALD S. BARROWS, OF ROCHESTER, NEW YORK

REMOVABLE PIPE ORGAN VALVE

Application filed October 16, 1928. Serial No. 312,871.

This invention aims to provide a reliable pipe organ valve structure characterized by the valve actions for the individual pipes being formed as units individually accessible for adjustment without demounting them from the chest, and capable of individual mounting or replacement without mutual interference or any necessity for taking apart the wind chest.

In addition to the general object just stated, the invention has for further objects such other improvements and advantages in construction and operation as may be attained by the structures and devices hereinafter described or claimed.

In the drawing which illustrates a structural embodiment of the invention in a preferred form.

The illustrative valve action is of the electro-pneumatic type, and includes a secondary valve directly controlling the supply of air to an organ pipe 3 and an electro-magnetically operated primary valve for controlling the operation of the secondary valve and responsive to the depression of a key at the console. The organ pipe 3 planted in the top board 1 of the wind chest 4, as shown in the drawings, is one of a series comprising a number of pipes chromatically differentiated in pitch and extending over a range of several octaves. Every series of pipes constitutes a stop, all the pipes of which are under the group control of the stop knob or tablet located at the console. When a stop is drawn or "on" the pressure air is admitted to the wind chest division containing the pipe series constituting that particular stop. The depression of a key will then cause the sounding of such of the correspondingly pitched pipes as belong to stops drawn on or coupled to that manual.

Ordinarily, each organ wind chest consists of several divisions, one for each stop. As each stop necessarily includes a large number of pipes to provide for the sounding of a complete chromatic compass of several octaves, a large number of key-controlled valves must be provided for the sounding of the pipes belonging to the stops of each manual. And this unavoidable duplication of the valves necessarily introduces complications in organ building and maintenance, particularly if the many valves are interrelated structurally with each other and with the wind chest, so as to make it necessary to disassemble the wind chest every time any one valve may require adjustment, repair or replacement.

The problem of assembly, repair and maintenance of the valves has been solved in large measure by the improved valve action, which provides an independent arrangement of each valve. Features of the valve action include: a capability of adjustment from the exterior of the chest, without removing the secondary valve which directly controls the air supply to the organ pipe, and also a capability of mounting or replacement of each valve action, wholly independently of any other, and without any necessity for disturbing the organ pipe, or removing any part of the wind chest.

The drawing shows an application to an organ wind chest of an illustrative embodiment of the improved valve action. For the sake of clearness, the before mentioned duplication of parts has been omitted from the illustration. The wind chest consists of a rectangular box-like structure made of the four sides and a top board 1 and the bottom board 5, and is divided into as many chest divisions as there are stops whose pipes are planted in the top board 1. The interior of each chest division functions as a pressure chamber 4, supplied, whenever the corresponding stop knob has been drawn at the console, with air under pressure employed in the operation of the primary valves under the control of manual keys and for the sounding of the pipes corresponding in pitch to the keys played.

The foot of the organ pipe 3 is planted in a socket in the top board 1. This socket is connected by a port 2 with the pressure chamber 4. The supply of air under pressure from chamber 4 through port 2 to the organ pipe is controlled by the illustrative valve mechanism.

The secondary valve directly controlling the flow through port 2 includes a valve disc preferably of laminated construction and suitably surfaced to provide an air tight fit whenever the valve is closed. The disc 6 is secured adjustably on the screw threaded top part of the valve stem 7, by thumb nuts located above and below the disc. The stem 7 passes through a bearing 17 seated in the top part of the valve tube 12. Both the stem and the tube extend vertically through the chamber 4 to the bottom board 5, which is provided with an opening 15 for receiving the lower portion of the tube and its enclosed valve stem. A hub 14 projects upwardly from the base mounting hereinafter described, into opening 15 and is detachably connected to the valve tube. The openings 15 in the bottom board are located in registering alinement with the corresponding ports 2 in the top board 1, and are relatively larger in diameter than the valve discs 6 and tubes 12, to permit insertion or withdrawal of the complete valve assembly forming each unit, without removing any part of the wind chest.

The base mounting supporting the parts of the valve action is secured on the outside of the chest. It is constructed so as not only to permit mounting or demounting of the entire valve action as an independent unit in respect of the organ pipe and of the other valves and the wind chest, but also to afford ready access to such parts of the valve action as may require adjustment. In the illustrated embodiment, the base mounting includes a carrier supporting the entire valve tube 12 and the enclosed valve stem 7, and also supporting the operating means for the secondary valve, and the parts of the primary valve, including the electromagnet and its armature.

The operating means for the secondary valve is located at the bottom of the wind chest adjacent to the bottom board, and is exposed at its bottom by the removal of a part of the base mounting from the carrier. The carrier is constructed to provide air flow ducts, and also an armature chamber, both of which may be exposed to ready access. The exposure of the parts supported or provided by the carrier is effected by removing a cover plate demountably applied to the carrier. This cover plate provides a closure for the valve chamber and the operating means of the secondary valve, and also provides an armature seat registrable with the armature chamber and an exhaust port controlled by the armature or primary valve.

The carrier member of the base mounting may be formed as a plate 16 made of any durable material, such as metal, and carries the upwardly projecting hub 14 adapted to extend within the opening 15 of the bottom board 5. The bore of the hub 14 is provided with screw threads for cooperation with the exteriorly threaded enlarged base portion 13 of the valve tube 12. Preferably, the bore of hub 14 and said screw threaded portion 13 are relatively larger in diameter than the valve disc 6, permitting application or demounting of the disc and tube, if desired, without removal of the carrier plate 16 from the base board. Nevertheless, the valve tube and other parts of the secondary valve may also be applied to or removed from the wind chest as a unit together with the carrier plate.

Figures 1, 2, 3, 3A, 4:
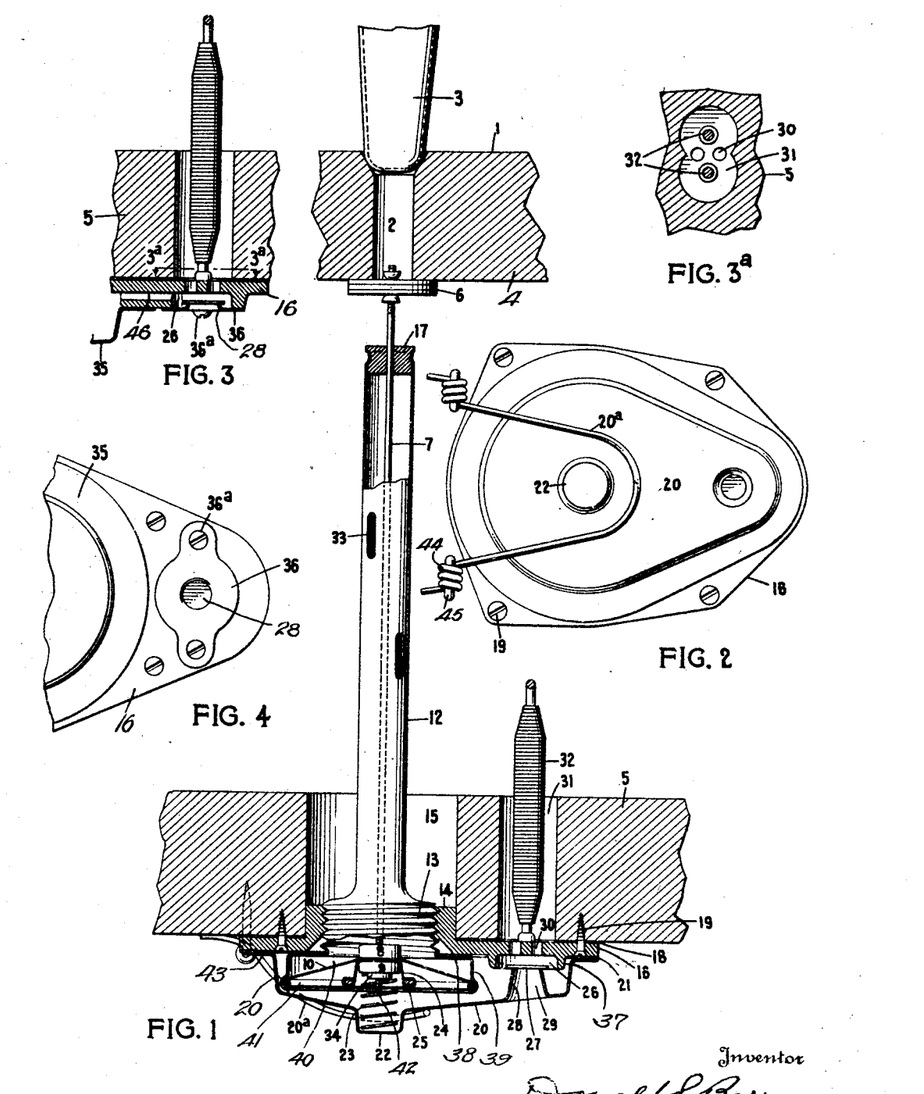
Figure 1 is a cross section through an organ wind chest showing the valve in place.
Figure 2 is a bottom plan view.
Figure 3 is a fragmentary view similar to Figure 1 and showing a slight modification of the cap arrangement, Figure 3ª is a cross section on the line 3ª—3ª of Figure 3.
Figure 4 is a bottom plan view of what is shown in Figure 3.

Adjacent to each opening 15, the base board is provided with an opening 31, having the dual function of receiving the electromagnet 32 and of providing a passage for the flow of pressure air controlled by the operation of the primary valve. The poles of the electro-magnet 32 are supported in sockets provided in the carrier plate 16, which extends horizontally beneath the opening 31, as shown in Figures 1, 3 and 3a.

In its portion below the opening 31, the carrier plate 16 is provided with a pair of air flow ducts 30 in registration with said opening 31. These ducts 30 connect the opening 31 with the primary valve or armature chamber 26. The armature chamber 26 is located on the under surface of the plate 16, and is defined by the surrounding flange 37 depending from plate 16.

Below the screw threaded portion 13, the base of the tube 12 is bent outwardly to form a surrounding horizontal shoulder 38 and the latter is rebent at its outer edge downwardly to provide a surrounding depending apron 39. Thus formed, the base of the tube provides a valve chamber in which is located the operating means for the secondary valve. When the tube 12 is mounted in the carrier plate the shoulder 38 engages a gasket 21 interposed between it and the bottom surface of the carrier plate, thereby providing a leak tight joint between the primary valve chamber and the carrier plate 16.

The operating means for the secondary valve includes the diaphragm 10 which is located within the secondary valve chamber 40. This diaphragm may be made of a suitable membrane, such as a piece of thin leather of the proper size, supported in position by an expansion ring 41 which presses the outer edge of the membrane into a horizontal groove located near the lower edge of the apron 39. The center of the diaphragm 10 is pierced by the screw threaded end 42 of the valve stem, and is retained in adjusted position relatively to the valve stem by upper and lower washers 8 and 9, preferably made of a relatively thick leather, respectively engaging the top and bottom surfaces of the diaphragm. These washers are likewise pierced by the screw-threaded lower end of the stem. If desired, a retaining washer 34 may be screwed on the stem below the lower washer 9. The diaphragm 10 is operated by pneumatic pressure to lower the valve stem 7 to open the secondary valve 6 but is lifted by spring action applied by a coil spring 23 against the lower washer 9 to lift the stem 7 and close the valve 6.

The base mounting includes a cover plate 20, preferably made of sheet metal. At its outer edge the main body portion of the cover plate is bent upwardly to provide a surrounding web 20'. This web 20' is rebent at its upper edge into a surrounding web flange 43, which projects horizontally from the web 20' and seats against the gasket 21 between it and the bottom surface of the carrier plate 16. The cover plate 20 completely encloses the secondary valve chamber and in the form shown in Figures 1 and 2 also the primary valve or armature chamber 26, and provides a hollow casing through which air under pressure may pass from the armature chamber 26 to the exposed lower end of the secondary valve chamber 40 and act against the bottom surface of the diaphragm 10. Below the lower end of the valve tube 7 and the washer 9 the main body portion of the cover 20 is bent to form a well or socket 22, which receives the lower end of the coil spring 23.

The cover plate 20 is constructed to provide a seat for the armature 27 of the primary valve and also an exhaust port controlled by said armature. This is accomplished by forming that portion of the cover plate below the primary valve chamber 26 into an upwardly projecting thimble 28 smaller in diameter than chamber 26. The thimble 28 is open at its top and provides an exhaust port 29 controlled by the armature 27 which seats on the periphery of the thimble to close the exhaust port whenever the electro-magnet 32 is deenergized.

The carrier plate 16 is removably secured in registering position by screws 19 to the bottom surface of the bottom board 5, and may be detached quickly when it is necessary to demount the entire valve action. It is desirable, however, that the cover plate be capable of ready removal without necessity for operating any screws. In the construction illustrated in Figures 1 and 2, the cover plate 20 is held in position by a wire spring 20ᵃ engaging its under surface. The ends of the wire spring may be coiled as shown at 44 around brads 45 secured to the bottom board 5.

In the alternative shown in Figures 3 and 4, the cover plate 35 terminates short of the primary valve chamber and an auxiliary cover plate 36 is provided for the primary valve. The auxiliary cover plate is formed with a like thimble 28, and is detachably secured to the carrier plate 16 by screws 36ᵃ. In this construction, the carrier plate 16, is formed with a horizontal air flow duct 46 leading from the armature or primary valve chamber 26 to the space inclosed by the cover plate 35.

If desired, the downward movement of the secondary valve may be limited by an apron 24, supported on the stem 7 between the lower washer 9 and the diaphragm 10. The apron surrounds and projects below the washer 9, and is provided at its lower end with an outwardly flaring flange 25 to engage the cover plate 20 and to limit the downward movement of the valve.

The illustrative valve action provides an arrangement in which the operating parts of both the primary and secondary valves are located in positions which are readily accessible from the bottom of the wind chest. Both the pneumatic operating element 10 of the secondary valve and the armature 27 of the primary valve may be reached for adjustment purposes by the simple expedient of removing the cover plate 20 or alternatively the covers 35 and 36. Adjustment of the secondary valve is effected by turning the valve stem 7 relatively to the diaphragm 10 and the washers 8 and 9.

Describing the operation: When the electro-magnet is deenergized, the armature 27 seats over the port 29 and prevents exhaust of fluid pressure. Hence, fluid pressure from the wind chest passes through an opening 31 and ducts 30 and thence through the primary valve chamber 26 and surrounding passage way provided by the cover plate 20, so that the under surface of the diaphragm is exposed to the pressure within the wind chest. At the same time, the upper surface of the diaphragm 10 is likewise exposed to the wind chest pressure by reason of the flow through the ports 33 in the valve tube 12, which delivers the fluid pressure to the upper part of the secondary valve chamber. Under these conditions, the pressure is balanced above and below the diaphragm 10 with the result that the spring 23 acts to lift the valve stem 7 and to maintain the secondary valve disc in position to close pipe port 2. When the electro-magnet 32 is energized by the depression of a manual or pedal key, the armature 27 is attracted upwardly, to close ports 30 and concurrently to uncover exhaust port 29. This action permits the discharge of fluid pressure from below the diaphragm 10. The upper portion of the diaphragm, however, remains exposed to the wind chest pressure, as a result of which the spring action is overbalanced, and the diaphragm 10 is depressed to lower the valve stem 7 and valve disc 6, thereby uncovering port 2 and permitting the organ pipe 3 to speak. As soon as the key is released, the electro-magnet is deenergized, whereupon the armature 27 returns to its position to uncover the ports 30 and close the exhaust port 29. The flow of fluid pressure is thus re-established to the under surface of the diaphragm 10 and the spring 23 is permitted to lift the diaphragm and the valve disc to close the organ pipe port 2.

Figure 5:
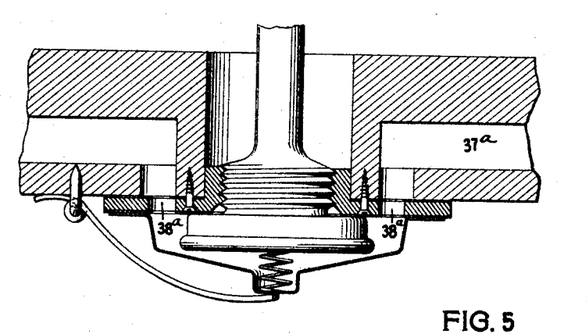
Figure 5 is a detail section showing the arrangement when several valves are operated by one magnet.

The above description relates to the so-called unit valve having its own magnet. When several valves are operated by one magnet the bottom board of the wind chest is usually channeled as at 37ᵃ in Figure 5. This involves no change in the construction of the adjustable and removable valve except the omission of the magnet 32 and the provision of holes 38ᵃ so that the space within the cap or cover becomes in effect a continuation of the channel 37ᵃ.

In the case of very large pipe valves where it is necessary to exhaust from the diaphragm chamber a relatively large amount of pressure air, and at the same time secure the same prompt action as with smaller valves a pneumatic relay is used. Referring to the above described structure, it will be seen that in the case of a very large pipe the small area of the port 29 uncovered by the magnet armature 27 would not exhaust quickly enough the relatively large volume of air under pressure beneath the larger diaphragm. It has therefore become a standard practice to interpose an intermediate diaphragm of the largest size which the magnet valve will exhaust instantaneously, between the valve and the electro-magnet, this intermediate diaphragm operating a disk valve which uncovers a large enough opening to exhaust the main diaphragm also instantaneously. In some cases extremely large pipes may require two of such relays but simply for the purpose of illustrating my removable and adjustable valve structure in association with a relay, only one of the latter is shown in the modification illustrated in Figure 6 of the drawings. It should also be stated that this figure illustrates an additional slight modification of the shape of the diaphragm chamber whereby a further simplification is effected.

Figure 6:
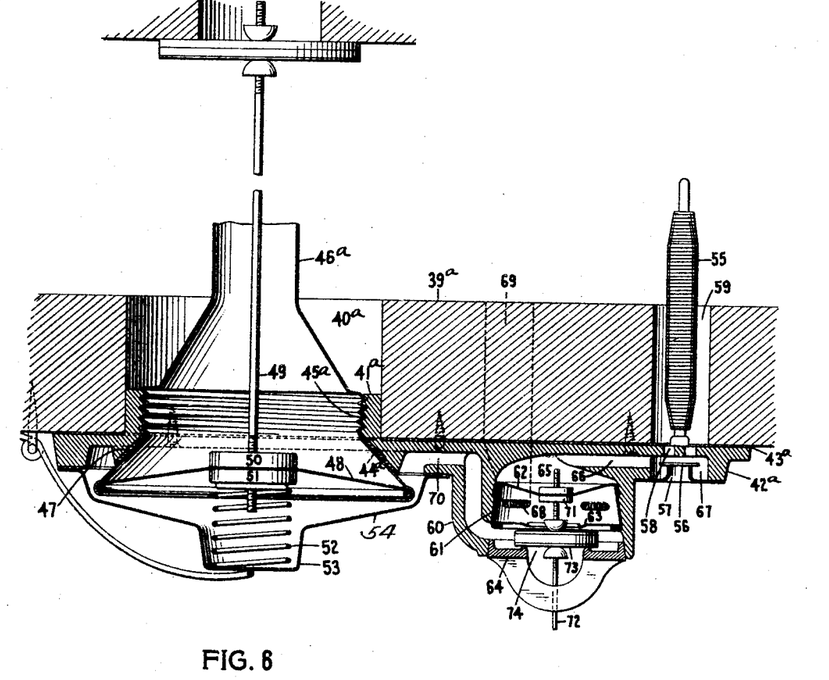
Figure 6 is a sectional view of a larger valve in combination with a pneumatic relay.

Referring to Figure 6 in detail, the numeral 39ᵃ designates the bottom board of the wind chest having an opening 40ᵃ within which fits the vertical flange portion 41ᵃ of the valve frame 42ᵃ which may be secured in place in any desired manner and which is preferably made air tight by a gasket 43ᵃ. The diaphragm chamber is shown as formed by a metallic shell member 44ᵃ having an intermediate threaded portion 45ᵃ screwed into the flange 41ᵃ and terminating in a tube 46ᵃ corresponding to the tube 12. The shell member 44ᵃ is disclosed as being of frustoconical shape and an air tight joint may be assured simply by providing a gasket 47 interposed between the shell member 44ᵃ and the adjacent inclined or tapered portion of the frame.

A thin leather or other suitable diaphragm 48 is stretched across the shell member 44ᵃ and suitably secured thereto at its periphery. The spindle 49 carries buttons 50 and 51, as in the first described form, located at opposite sides of the diaphragm, and is normally held in its uppermost position by a spring 52 located within a pocket or recess 53 in the removable cap or cover 54. The above described latch means may be prvoided for the cap 54. The same type of electromagnet, indicated at 55, is provided as in the first described form and is so positioned as to attract an armature disk 56 which normally covers the exhaust port 57 and which is adapted, when attracted as the result of energization of the magnet, to close openings 58 communicating with a relatively large opening 59 in the bottom board which communicates with the interior of the chest.

The frame 42 is formed to provide a relay chamber 60. I show but do not necessarily require a shell 61 with a relay diaphragm 62 attached to one end and an inner valve seat 63 attached to the other. The outer valve seat and spindle guide are formed by or in a removable cover 64. The space 65 above the relay diaphragm 62 communicates through passage 66 with the magnet armature chamber 67 above the armature 56, and the space between the diaphragm 62 and the valve seat 63 communicates through slots 68 and hole 69 with the interior of the wind chest. The space between the valve seat 63 and the cap 64 communicates through the passage 70 with the space or chamber beneath the diaphragm 48. The diaphragm 62 is secured by buttons 71 to a spindle 72 carrying a valve 73 adapted to cover or uncover an opening 74 in the cap 64 and adapted to cooperate with the seat member 63.

The operation of this form is as follows:

When the magnet 55 is energized, the armature 56 is attracted, closing the holes 58 and uncovering the exhaust port 57, allowing pressure air to escape from the chamber or space 65. The pressure air in the chamber 60 forces the relay diaphragm 62 upwardly and the valve 73 closes the opening in 63, and uncovers the opening 74, allowing the pressure air beneath the diaphragm 48 to escape through the passage 70, whereupon pressure in the wind chest forces the main diaphragm 48 downwardly against the pressure or resistance of the spring 52, thereby lowering the valve carried by the spindle 49 and allowing pressure air to escape to and through the pipe, or to perform any other useful purpose. The main feature of this particular relay is the incorporation of the relay chamber in the same casting with the magnet base instead of building this chamber in the bottom board and having the magnet communicate therewith through a hole in the bottom board.

Figures 7, 8, 9, 10:
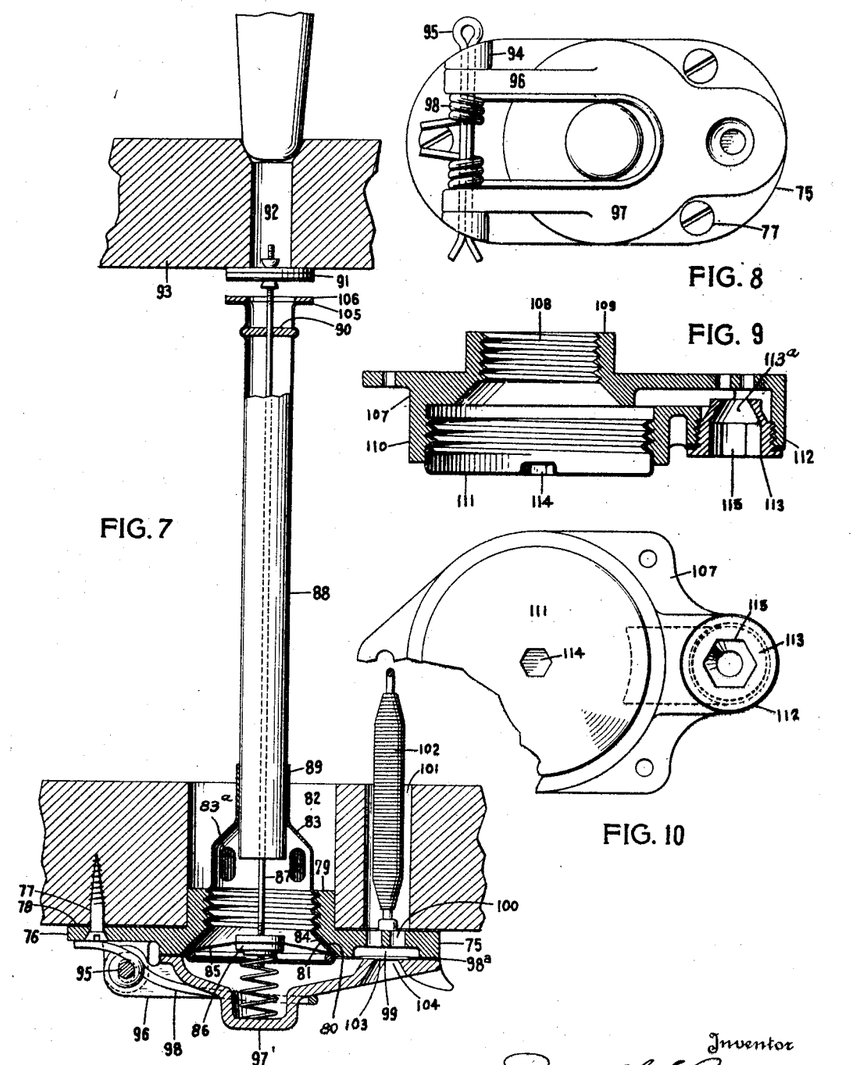
Figure 7 is a view similar to Figure 1 showing a valve which is extensible for use in wind chests of different depths, this modification also disclosing a different form of cap.
Figure 8 is a botton plan view.
Figure 9 is a detail section showing still another frame or base construction with an additional form of closure cap therefor.
Figure 10 is a bottom plan view of the structure shown in Figure 9.

In Figures 7 and 8 I have shown a valve structure embodying the same general characteristics as those previously described but further including additional advantageous features as well as modifications, this valve possessing an adjustment feature whereby it may be used in connection with wind chests of different depths. Referring to these figures in detail, the body or base 75 has a flat attaching plate portion 76 secured as by suitable means 77 beneath the bottom board, with a gasket 78 interposed for the purpose of making the joint air tight. At substantially its center this body is formed with an opening surrounded by an upstanding internally threaded flange 79, the opening being flared at its lower end to define a tapered seat 80 against which there is preferably disposed a gasket 81. The flange 79 of course fits within the opening 82 in the bottom board of the wind chest. The valve itself is of the same general construction as that disclosed in Figure 6 and comprises a metallic shell 83, apertured at 83ª, having a threaded portion screwed into the flange 79 and having a flaring lower end 84 fitting against the gasket 81. Extending across the lower end of this flared chamber portion is a diaphragm 85 held in place in any desired manner and provided at its center with buttons 86 or the like disposed on opposite sides and mounted upon a rod or spindle 87. The valve mechanism further includes a tube 88 which is telescopically engaged with a tubular extension 89 on the member 83. The spindle or rod 87 extends axially through the tube 88 and through a guide 90 therein and carries a locally adjustably mounted valve disk 91 adapted to cover or uncover the pipe foot receiving hole 92 in the top board 93 of the wind chest. Instead of providing apertures 83ª in the shell, they may obviously be formed in the tube 88, as in Figure 1.

In this form of the invention the base or body 75 is shown as provided on its underside with ears 94 between which are pivoted, as by an element 95, arms 96 formed or otherwise provided upon a cap or cover 97 which normally seats under the influence of a coiled or looped spring 98 against the underside of the body or base 75, it being preferable that a gasket 98ª be interposed in order to insure an air tight joint. The base or body 75 is laterally extended and the extending portion is formed with a chamber 99 communicating through ports 100 with an opening 101 through the bottom board, within which opening is mounted the electro-magnet 102 positioned to attract an armature 103 which normally closes an outlet port 104 in the cover 97. This armature, when attracted, closes the openings 100 to permit exhaust through the opening 104 of the air beneath the diaphragm 85. The operation of this form of the invention is identically the same as that of the first described form, the only differences being in the actual construction which involves the provision of a different cap from that previously described, with accompanying modification of the base or body, together with the feature of the telescopic adjustment of the valve tube 88 with respect to the chamber 83. There is an additional slight feature of difference and that is that the upper end of the tube 88 is preferably provided with an outturned flange 105 which may be padded at 106 and which serves as a stop for limiting downward movement of the valve disk 91 and consequently downward movement of the diaphragm 85 instead of providing the apron 24 and ring 25 as shown in Figure 1.

In Figures 9 and 10 I have shown another modification in the construction of the base, body or frame whereby a still different type of closure cap or cover may be used. Referring to these figures in detail, the numeral 107 designates the base or body as a whole, which body is formed with an opening 108 surrounded by an internally threaded flange 109. This opening is adapted to receive the valve structure disclosed in Figure 7, there being no necessity for any change whatsoever. The only real difference is that the body is provided at its underside with an internally threaded flange 110 within which is screwed a correspondingly threaded closure cap 111 for the purpose of forming a seal for the air chamber. The body is also provided at its underside with an internally threaded depending flange 112 within which is screwed a closure plug or cap 113, ported at 113ª corresponding to the ports 29, 57 and 104, and which may be removed to give access to the armature covering the port or ports 113ª. Any desired means may be provided whereby the closures 111 and 113 may be turned and in the present instance the former is represented as having an angular recess 114 therein while the latter is provided with an angular extension or projection 115. A valve mechanism embodying the base or frame construction shown in Figures 9 and 10 would operate in identically the same manner as those previously described, the only difference being in the construction of the closure means which are readily removable whenever it is desired to remove the entire valve for inspection, adjustment or replacement.

While I have shown and described preferred embodiments of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In a pipe organ, a wind chest, a pipe, and a valve structure for controlling communication between the wind chest and the pipe, said valve structure being assembled as a unit, inserted in place and connected to the wind chest whereby it is bodily removable therefrom, and means for adjusting said valve from the exterior of the wind chest and without removing the valve or the pipe.

2. In a pipe organ having a wind chest provided with an opening receiving the foot of a pipe and having a second opening in coaxial relation to the first named opening, a valve mechanism including a frame removably mounted upon the wind chest, a valve assembly detachably connected with the frame at the second named opening and projecting therethrough, said assembly including a diaphragm chamber, an intermediate portion connected with the frame and an upstanding apertured tubular portion, a spindle connected with the diaphragm and carrying a valve element for controlling communication through the first named opening, a removable cover having air tight connection with the frame, and means for controlling the air pressure at one side of the diaphragm.

3. In a pipe organ having a wind chest at its top provided with an opening receiving the foot of a pipe and having its bottom formed with an opening in coaxial relation to the first named opening, a valve mechanism including a frame removably mounted upon the bottom of the wind chest, a valve assembly detachably connected with the frame at the second named opening and projecting therethrough, said assembly including a diaphragm chamber, an intermediate portion connected with the frame and an upstanding apertured tubular portion, a spindle connected with the diaphragm and carrying a valve element for controlling communication through the first named opening, a removable cover having air tight connection with the frame, and means for controlling the air pressure at opposite sides of the diaphragm, said means comprising an electromagnetically opened relief port.

4. The combination with a pipe organ wind chest, of a valve action including, a valve body within said chest controlling an organ pipe planted in the top board thereof, a valve stem supporting said body extending through the wind chest to the bottom board thereof, a pneumatic operating element adjustably engaging the lower portion of said stem, a valve tube extending to said bottom board, said tube surrounding said stem and providing a valve chamber casing in which said pneumatic operating element is supported in position accessible exteriorly of said chest, and a base mounting for said valve action involving, a carrier plate detachably secured to said bottom board and provided with a hub detachably supporting said valve tube, and an independently removable cover plate constituting a closure for said pneumatic operating element.

5. The combination with a pipe organ wind chest, of a valve action including, a valve body within said chest controlling an organ pipe planted in the top board thereof, a valve stem supporting said body extending to the wind chest bottom thereof, a pneumatic operating element adjustably engaging the lower portion of said stem, and a valve tube also extending to said bottom board, said tube surrounding said stem and providing a valve chamber casing in which said pneumatic operating element is supported in position accessible exteriorly of said chest, and an exterior base mounting for said valve mechanism involving a support for said tube and a removable closure for said pneumatic operating element.

6. The combination with a pipe organ wind chest, of a valve action, including, a valve body within said chest controlling an organ pipe planted in the top board thereof, a valve stem supporting said body and extending to the wind chest bottom board thereof, a pneumatic operating element adjustably engaging the exterior portion of said stem, a valve tube also extending to said bottom board, said tube surrounding said stem and providing a valve chamber casing in which said pneumatic operating element is supported in position accessible exteriorly of said chest, and an electro-magnet extending into said bottom board, and an exterior base mounting for said valve action supporting said tube and electro-magnet and providing a removable closure for said pneumatic operating element.

7. The combination with a pipe organ wind chest, of a pipe, a removable valve action extending from the interior to the exterior of the chest and adapted to directly control communication between said chest and pipe, pneumatic operating means connected with said valve action in a position accessible exteriorly of the chest, and an exterior mounting for said valve action detachably secured thereto and to the chest and provided with a closure permitting access to said pneumatic operating means.

8. The combination with a pipe organ wind chest, of a pipe, a removable valve action extending from the interior to the exterior of the chest and adapted to directly control communication between said chest and pipe, pneumatic operating means connected with said valve action in a position accessible exteriorly of the chest, an electro-magnet, and an exterior mounting for said valve action detachably secured thereto and to the chest, said mounting supporting said electro-magnet and provided with a removable closure for said pneumatic operating means.

9. The combination with a pipe organ wind chest, of a pipe, a removable valve action extending from the interior to the exterior of the chest and adapted to directly control communication between said chest and pipe, pneumatic operating means connected with said valve action in a position accessible exteriorly of the chest, an electro-magnet, and an exterior mounting supporting said valve action and said electro-magnet and provided with a removable closure for said pneumatic operating means.

10. The combination with a pipe organ wind chest, of a pipe, a removable valve action extending from the interior to the exterior of the chest and adapted to directly control communication between said chest and pipe, pneumatic operating means connected with said valve action in a position accessible exteriorly of the chest, and an exterior mounting supporting said valve action and provided with a removable closure for said pneumatic operating means.

11. A pipe organ valve action involving, a carrier plate perforated to provide a screw threaded bore, and demountable valve mechanism including a valve tube provided with a screw threaded portion screwed in the bore of said carrier plate.

12. A pipe organ valve action involving, a valve tube having at one end a casing providing a valve chamber, a pipe controlling valve element supported by said tube and extending into said chamber, a pneumatic operating element adjustably engaging said valve element within said chamber, and a mounting supporting said valve action, including, a tube carrier plate and a removable cover plate constituting a closure for said valve chamber, said plates conjointly providing flow passages for the air controlling the operation of the valve.

13. A pipe organ valve action involving, a valve tube having at one end a casing providing a valve chamber, a pipe controlling valve element supported by said tube and extending into said valve chamber, pneumatic valve operating means within said chamber, and a mounting supporting said valve tube, said mounting being perforated to provide flow passages for the air controlling the operation of the valve.

14. A pipe organ valve action involving, a valve tube having at one end a casing providing a valve chamber, a pipe controlling valve element supported by said tube and extending into said valve chamber, pneumatic valve operating means within said chamber, an electro-magnet, and a mounting supporting said tube and electro-magnet, including, a carrier plate and a removable cover plate constituting a closure for said valve chamber, said plates conjointly providing flow passages for the air controlling the operation of the valve.

15. A pipe organ valve action involving, a valve tube having at one end a casing providing a valve chamber, a pipe controlling valve element supported by said tube and extending into said valve chamber, pneumatic valve operating means within said chamber, an electro-magnet, and a mounting supporting said tube and electro-magnet, said mounting being perforated to provide flow passages for the pressure air controlling the operation of the valve.

16. A pipe organ valve action involving, a valve tube having at one end a casing providing a valve chamber, a pipe controlling valve element supported by said tube and extending into said valve chamber, pneumatic valve operating means within said chamber, a spring acting on said valve element to keep the valve normally closed, and a mounting including a carrier plate supporting said tube and a removable cover plate constituting a closure for said valve chamber and a support for said spring.

17. A pipe organ valve action involving, a valve tube having at one end a casing providing a valve chamber, a pipe controlling valve element supported by said tube and extending into said valve chamber, pneumatic valve operating means within said chamber, a spring acting on said valve element to keep the valve normally closed, and a mounting including a carrier plate supporting said tube and a removable cover plate constituting a closure for said valve chamber and a support for said spring, said plates conjointly providing flow passages for the air controlling the operation of the valve.

18. The combination with a pipe organ wind chest, of a complete pipe controlling valve action extending from the interior to the exterior of the chest, pneumatic operating means connected with said valve action in a position accessible exteriorly of the chest, and an exterior mounting for said valve action detachably secured to said valve action and to the chest, said mounting being perforated to provide flow passages for the air controlling the operation of the valve.

19. The combination with a pipe organ wind chest, of a complete pipe controlling valve action extending from the interior to the exterior of the chest, pneumatic operating means connected with said valve action in a position accessible exteriorly of the chest, and an exterior mounting for said valve action, enclosing said operating means and perforated to provide flow passages for the air controlling the operation of the valve.

20. The combination with a pipe organ wind chest, of a complete pipe controlling valve action extending from the interior to the exterior of the chest, pneumatic operating means connected with said valve action adjacent to the exterior of the chest, and a mounting enclosing said operating means, said mounting being constituted of mutually detachable plates conjointly providing flow passages for the air controlling the operation of the valve.

21. In a pipe organ including a wind chest having a pipe socket and a valve opening respectively located in mutual registering alinement in opposite boards of the chest, the improvement characterized by a pipe controlling valve action involving an exterior valve body located in proximity to said socket, exterior pneumatic valve operating mechanism, and an exterior mounting providing a pressure flow passage and an accessible enclosure for said operating mechanism, the parts of the said valve action being assembled into a structural unit applied to the chest by insertion into said valve opening.

22. In a pipe organ including a wind chest having a pipe socket and a valve opening respectively located in mutual registering alinement in opposite boards of the chest, the improvement characterized by a pipe controlling valve action involving an interior valve body located in proximity to said socket, pneumatic valve operating mechanism positioned for access from the exterior of the chest, and a connection between said valve body and said operating mechanism, the parts of said valve action being assembled into a structural unit applied to the chest by insertion into said valve opening.

23. The combination with a pipe organ wind chest, of a valve action including, a valve body within said chest controlling an organ pipe planted in the top board thereof, a valve stem supporting said body and extending through the wind chest bottom board to the exterior, valve operating means engaging the lower portion of said valve stem, and a base mounting for said valve action, inclosing and supporting said operating means and detachably secured to said bottom board.

24. The combination with a pipe organ wind chest, of a unitary pipe controlling valve action extending from the top to the bottom board thereof, valve operating means located adjacent to the bottom board, and an exterior mounting for said valve action, inclosing said operating means and detachably secured to said valve action and to the bottom board of said chest.

25. The combination with a pipe organ wind chest, of a unitary pipe controlling valve action extending from the top to the bottom board thereof, valve operating means accessible from the bottom board of the chest, and an exterior mounting for said valve action supporting said operating means and detachably secured to the bottom board of the chest.

26. The combination with a pipe organ wind chest, of a unitary complete pipe controlling valve action extending from the interior to the exterior of the chest and including a pneumatic operating element accessible from the exterior of the chest, and a mounting for said valve action detachably secured to the exterior of the chest.

27. The combination with a pipe organ wind chest, of a complete pipe controlling valve action extending from the interior to the exterior of the chest and including a pneumatic operating element located at the exterior of the chest, and a mounting for said valve action detachably secured to the exterior of the chest.

28. The combination with a pipe organ wind chest, of a pipe planted in the top board thereof, a secondary valve controlling said pipe and extending from the top to the bottom board of the chest, operating means located adjacent the bottom board, a base mounting for said secondary valve detachably secured to the bottom board and permitting removal of the secondary valve as a unit from the chest, and a cover removably connected to the base mounting and affording access to the operating means.

29. The combination with a pipe organ wind chest, of a pipe planted in the top board thereof, a secondary valve extending from the top to the bottom board of the chest and including valve operating means accessible from the exterior of the chest, a base mounting for said secondary valve detachably secured to the bottom board and permitting removal of the secondary valve as a unit from the chest, and a closure on the base removable to afford access to the operating means.

30. The combination with a pipe organ wind chest, of a pipe planted in the top board of the chest, a secondary valve extending from the top to the bottom board and including valve operating means located adjacent to the bottom board, a primary valve controlling said secondary valve and located adjacent said bottom board, a base mounting supporting both the primary and secondary valves and detachably secured to said bottom board for permitting removal of said valves as a unit from the chest, and removable closure means on said base affording access to the valve operating means.

In testimony whereof I affix my signature.

DONALD S. BARROWS.